July 15, 1941.  D. G. McCAA  2,249,534
STATIC REDUCING DEVICE
Filed July 6, 1940   2 Sheets-Sheet 1

INVENTOR.
DAVID G. McCAA
BY *James M. Heilman*
ATTORNEYS.

July 15, 1941.　　　D. G. McCAA　　　2,249,534
STATIC REDUCING DEVICE
Filed July 6, 1940　　　2 Sheets-Sheet 2
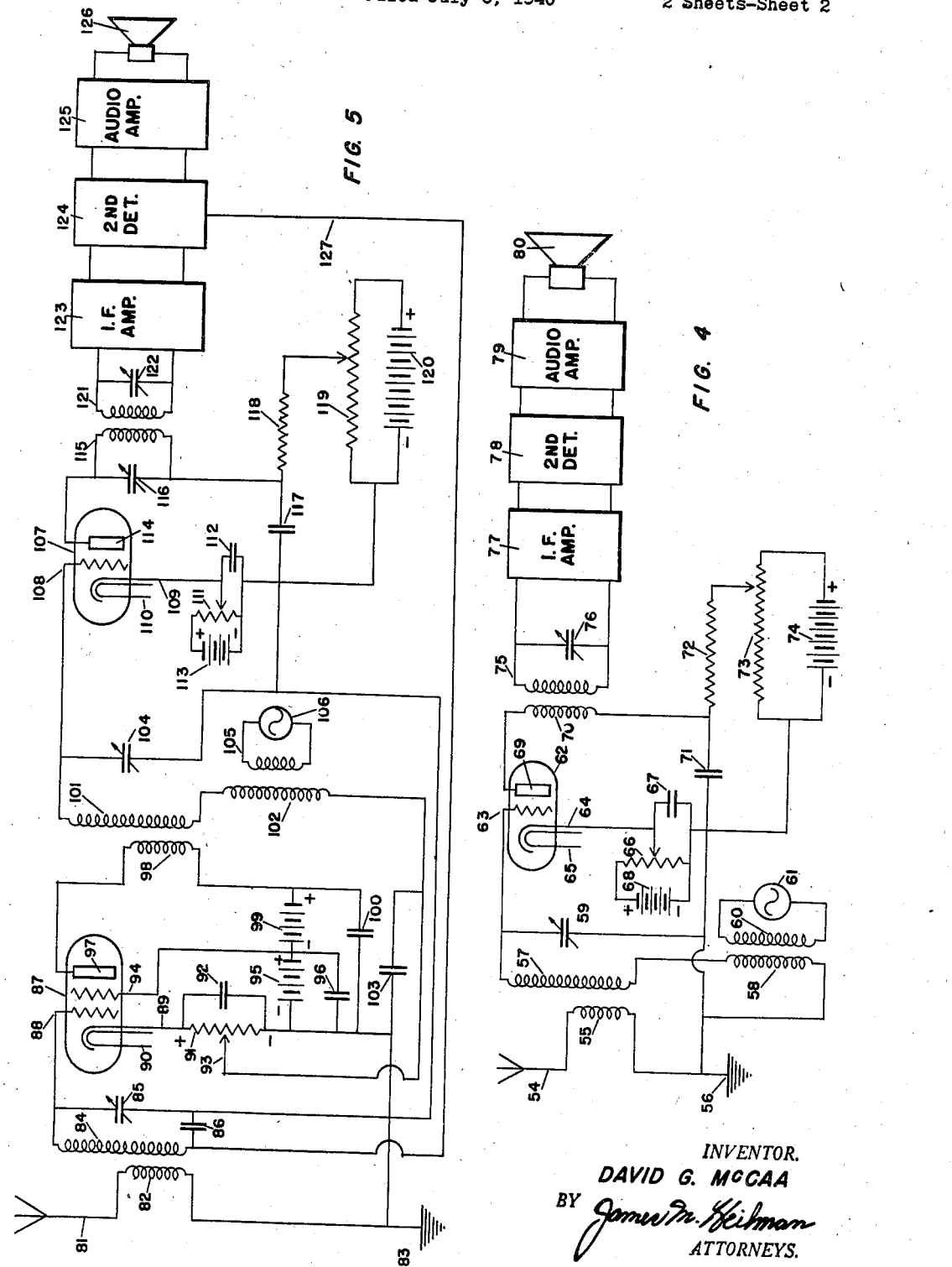
INVENTOR.
DAVID G. McCAA
BY James M. Heitman
ATTORNEYS.

Patented July 15, 1941

2,249,534

UNITED STATES PATENT OFFICE 2,249,534

STATIC REDUCING DEVICE

David G. McCaa, Lancaster, Pa.

Application July 6, 1940, Serial No. 344,199

10 Claims. (Cl. 250—20)

This invention relates to electrical communication systems, and particularly to limiters for use therein for the reduction of high amplitude oscillations, that produce interfering noises, herein termed static.

The principal object of my invention is to provide means for limiting the energy transferred by a signal transfer circuit, to values of a smaller range than has been attainable with the previously known devices intended for this purpose.

Other objects of this invention will be apparent from this description of typical embodiments thereof, and the various modifications referred to, and relate particularly to the simplification, refinement, and systematic control of the device of my invention.

Without limiting the application of the principle of my invention, I will explain it with reference to drawings of simple and useful embodiments, wherein:

Fig. 4 represents my invention employed in the first detector in a superheterodyne receiver; and Fig. 5 represents my invention employed in the first detector in a superheterodyne receiver with automatic volume control and automatic variation of the grid bias of the first detector.

Figure 1:
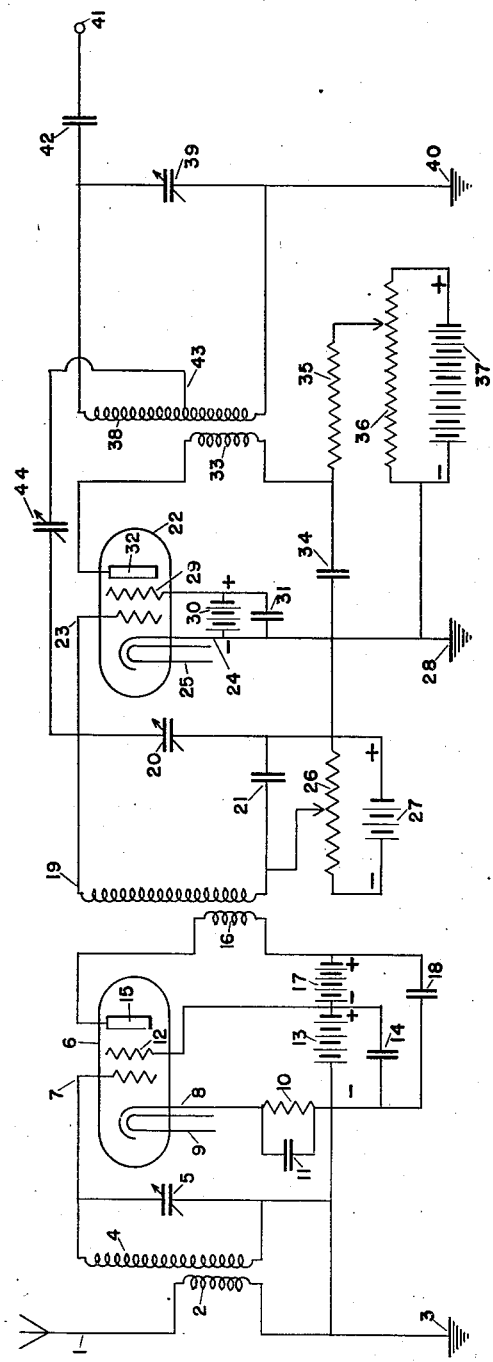
Fig. 1 represents one embodiment of my invention designed to operate between the radiant energy collector, such as an antenna or loop, and receiving apparatus for continuous oscillations.

In Fig. 1, 1 represents an antenna, 2 a primary inductance which is grounded at 3. The secondary inductance 4 is coupled to the primary 2. The variable tuning capacity 5 is connected in parallel to the inductance 4. The tuned circuit comprising inductance 4 and capacity 5 is connected to the screen grid tube 6 as follows: One terminal of the condenser 5 connects to the control grid 7. The remaining terminal of the condenser 5 connects to the ground at 3. The unipotential cathode 8 is actuated by the heater 9, which may be energized by a battery or by alternating current. The cathode 8 is connected to the ground 3 through the biasing resistor 10, which is by-passed by the condenser 11. The screen grid 12 connects to the positive terminal of the battery 13 which is by-passed by the condenser 14; the negative terminal of the battery 13 connects to the ground 3. The anode 15 connects to one terminal of the primary inductance 16, the other terminal of inductance 16 being connected to the positive terminal of the battery 17, which is by-passed by the condenser 18. The negative terminal of the battery 17 connects to the positive terminal of the battery 13.

While a suitable carrier-frequency amplifier has been described above, any other suitable device may be used for the purpose of selecting or amplifying the incoming signals or for both purposes, or if desired, these functions may be omitted.

The secondary inductance 19 is coupled to the primary 16. The variable tuning capacity 20 is connected in parallel to the inductance 19 through the large capacity of the by-pass condenser 21. The tuned circuit comprising inductance 19, and condensers 20 and 21 is connected to the screen grid tube 22 as follows: One terminal of the condenser 20 connects to the control grid 23, the remaining terminal of condenser 20 connects to the unipotential cathode 24 which is actuated by the heater 25 which may be energized by a battery or by alternating current. The control grid 23 is biased negatively by adjusting the potentiometer 26, which is shunted across the battery 27. The positive terminal of battery 27 and the cathode 24 are both grounded at 28. The by-pass condenser 21 keeps the radio frequency currents from flowing in potentiometer 26 and battery 27. The screen grid 29 connects to the positive terminal of the battery 30 which is by-passed by the condenser 31. The negative terminal of battery 30 connects to the cathode 24. The anode 32 connects to one terminal of the primary inductance 33; the remaining terminal of inductance 33 connects to the condenser 34 and the resistor 35. The remaining terminal of condenser 34 connects to cathode 24. The remaining terminal of resistor 35 connects to the slide on the potentiometer 36 which is shunted across battery 37. The negative terminal of battery 37 connects to the cathode 24 and ground 28.

The secondary inductance 38 is coupled to the primary 33. The variable tuning capacity 39 is connected in parallel to the inductance 38. One terminal of the tuned circuit comprising 38, 39 is connected to the ground 40, the other terminal being connected to the antenna post 41 of the radio receiver, through the coupling condenser 42. The inductance 38 is tapped at 43 and the tap connects to the small variable condenser 44. The remaining terminal of condenser 44 connects to the grid 23.

At will thus be seen that the circuit of tube 22 is generally that of a conventional carrier-frequency amplifier, except that special values of operating unidirectional potential may conveniently be chosen for the grid, plate, and screen electrodes, and unusual care is taken to prevent the transfer of energy through the tube, other than through the electronic path. Upon a full understanding of my invention, as described herein, it will be apparent that there is full freedom of choice of the circuit and parts used, so far as it is consistent with the above stated exceptions.

In the operation of the circuit of Fig. 1, the tuned circuits 4, 5 and 19, 20 and the tube 6 comprise a radio frequency amplifier and frequency selector. The reduction of high amplitude oscillations takes place in the tube 22 and is the result of the arrangement and design of the anode or output circuit 33, 34, 35 and 36, in cooperation with the proper values of bias on grid 23.

Figure 2:
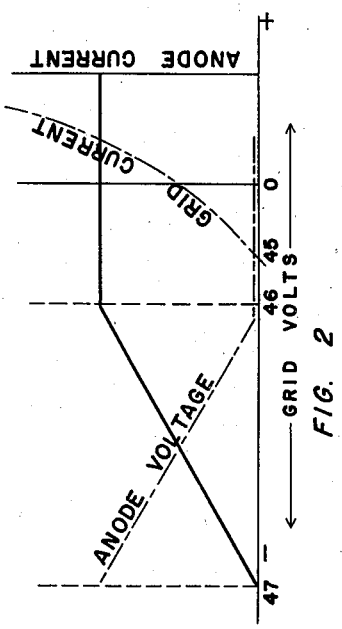
Fig. 2 shows the static characteristic of the herein described embodiments of my invention; variation of grid voltage being plotted against anode current, grid current and anode voltage.

Referring to Fig. 2, the static characteristic of the tube 22 and its associated circuits is represented by the graphs and can be produced by using any suitable triode or pentode, selecting the proper resistance value for resistor 35 and adjusting the impressed voltages taken off the potentiometers 36 and 26. With type 57 or 77 pentodes and with type 27 or 56 triodes, I have used values varying from one-half to ten megohms for resistor 35 with impressed voltages from cathode 24 to the potentiometer slider 36 varying from zero to seventy-five volts. More specifically, in a satisfactory embodiment using a type 57 tube, resistor 35 was five megohms with impressed voltage taken off the potentiometer 36 varying from zero to forty volts, twenty volts being a suitable value. The maximum negative grid bias on the potentiometer 26 may be six volts. The screen voltage battery 30 is made low in voltage, ranging from three to ten volts, three volts having been successfully used in this embodiment.

The general shape of the static characteristic represented in Fig. 2 is described in my United States Patents Nos. 2,095,261 and 2,112,705. With the grid voltage at zero, the anode current is substantially the same as if the anode to cathode path were replaced by a low resistance, the anode current being largely determined by the resistor 35 and the impressed voltage at the slider 36. Grid current appears when the grid voltage is zero and for positive grid voltages it rapidly increases, while the anode current remains substantially constant. As the grid voltage is adjusted from positive to negative, the grid current falls, reaching substantially zero at the ordinate 45; while the anode current remains constant until the grid voltage is at the more negative value at ordinate 46; the anode current then decreases steadily as the grid is made more and more negative, until finally zero anode current appears at the value of negative grid voltage indicated by the ordinate 47.

The anode to cathode voltage is very low at zero or positive grid voltages, owing to the large voltage drop across the resistor 35 and it remains low as the grid voltage is adjusted toward the negative until ordinate 46 is reached, then as the grid is made more and more negative, the anode voltage steadily rises because, as the anode current in resistor 35 decreases, the voltage drop across the resistor decreases. Finally at ordinate 47 value of negative grid voltage, the anode current is zero and the anode voltage is the same as the voltage at the source of voltage on potentiometer 36.

The dynamic characteristic of the anode circuit, as used in the above mentioned patents, is closely similar to the static characteristic described above. At a selected operating point on the sloping part of the anode current curve, when the signal voltages make the grid more negative the anode voltage increases, and for less negative grid voltages the anode voltage decreases. These changes in the anode voltage caused the anode current changes to be small and the output had to be taken off the anode resistor as voltage.

As will be clear from a study of the circuits of my above mentoined patents, the operation of the described devices is dependent upon the impedance between the anode and the cathode but external to the electron stream, being substantially the same at the working frequency as the resistance. The internal capacity of the tubes generally available, between the cathode and the anode, was entirely detrimental in its effect, and was one factor which limited the effectiveness of the method. In the present invention, however, the above mentioned limitation is negligible, and the operation of my present invention depends upon such different factors that I have included condenser 34 as an important element of the described embodiment.

Figure 3:
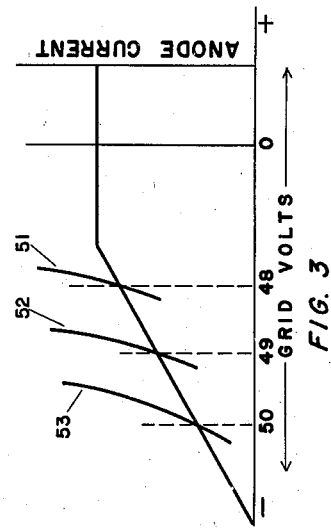
Fig. 3 shows the dynamic characteristic of these embodiments of my invention with grid voltage plotted against anode current.

My present invention thus differs widely from those of the above mentioned patents in the use of the condenser 34 and the output primary coil 33 in the anode circuit. Condenser 34 is made one-tenth microfarad or larger and the primary 33 is made of a usual value. The anode circuit of the tube 22 in Fig. 1 presents the static characteristic shown in Fig. 2. The dynamic characteristic is, however, widely different as represented in Fig. 3. The condenser 34 operates as a storage reservoir for electrical energy, the quantity of energy stored varying with the size of the condenser and the voltage impressed upon it. The voltage impressed upon the condenser 34 is substantially the same as the anode voltage in Fig. 2, therefore the charge in condenser 34 is very small when the grid voltage is zero or positive and it remains small as the grid voltage is adjusted toward the negative until the ordinate 46 value of negative grid voltage is reached; then, as the grid is made more and more negative, the anode current falls, the anode voltage rises, and the charge in condenser 34 steadily increases until the ordinate 47 value of negative grid voltage is reached, when the charge is at a maximum value determined by the voltage at the source of voltage on potentiometer 36.

Since a charged condenser operates momentarily like any other source of voltage, such as a battery, the graphs in Fig. 3 were obtained by substituting a battery voltage for the system 34, 35, 36, and adjusting the voltage so as to produce the same anode current as found at the selected operating points (ordinates 48, 49 and 50) when using the system 34, 35 and 36. With the same anode current in the two cases, the same anode voltage is present, the grid voltage remaining the same in each case. Fig. 3 shows the static characteristics of Fig. 2 with selected operating grid voltage points 48, 49 and 50 with the system 34, 35 and 36 in use. Substituting a battery for 34, 35 and 36 and adjusting the voltage for the same anode current at the same grid voltage or operating point, the grid voltage was increased and decreased in small steps above and below the selected operating point and the resultant anode current changes in each case are represented by the curves 51, 52 and 53.

Plotted curves show that the static characteristic curve is effectively a rectilinear (odd order) type, while the dynamic curves follow the even order or square law type.

If condenser 34 is charged to the maximum value by increasing the negative grid voltage to a value greater than required for zero anode current and the connection to resistor 35 is then opened, a fixed charge remains in the condenser 34. Under this condition, if signal voltages are impressed upon the grid and the unidirectional grid voltage is slowly reduced until each positive wave of the signal causes anode current to flow in the tube 22, there is a momentary signal output in the circuit 38, 39. The energy stored in the condenser 34 is soon exhausted as each positive wave of signal causes a unidirectional current to flow in the primary 33 and tube 22 each time the tube impedance is lowered. The time required to exhaust the charge in condenser 34 varies with the signal amplitude. The quantity of energy exhausted per unit of time represents a definite rate of flow of energy out of the condenser 34 which is dependent upon the amplitude of the signal oscillating voltages on the grid. This constant drainage also appears when the direct grid voltage is set to the operating point required by the signal amplitude.

Another action in the anode circuit of Fig. 1 is found in the time constant presented by the condenser 34 and the resistor 35. The rate of flow of energy or the quantity of energy per unit of time delivered to the condenser 34 is dependent upon the value of the resistor 35, the impressed voltage at the voltage source 36, and the voltage drop across the resistor caused by the anode current. Owing to the square law character of the dynamic characteristic, signal oscillations cause the average anode current to rise no matter where the operating point is selected along the static characteristic. This rise of anode current decreases the rate of flow of energy into condenser 34 since the voltage drop across the resistor 35 is increased and the impressed voltage is thereby decreased.

The rate of flow of energy into the condenser 34 has been controlled by other means. Without using the resistor 35, intermittent contacts can be made between the condenser 34 and the source of voltage 36; the quantity of energy delivered per unit of time then varies with the number of contacts per unit of time, the time duration of each contact and the voltage at the source 36. A reactance coil or a resistor will retard the rate of flow for any combination of the last above factors, if placed between the voltage source 36 and the intermittent contact device.

The manual operation of the system shown in Fig. 1 is as follows: with a radio receiver connected to post 41 and tuned to a desired signal frequency the circuits, 4, 5; 19, 20; and 38, 39 are tuned to the same desired signal frequency. With the tubes 6 and 22 in operation, the voltage source 36 is set to a given value, for example twenty volts, and the grid voltage is adjusted on the potentiometer 26. With the signal and higher amplitude static oscillations induced in the circuit 4, 5, they are amplified by the tube 6 and delivered to the circuit 19, 20. The adjustment of the grid voltage at the potentiometer 26 will cause signal to appear as the unidirectional negative voltage is slowly increased and the static oscillations will be markedly reduced, provided the grid voltage is not made more negative at potentiometer 26 than enough to transfer a satisfactory signal, because the rise in the average anode current due to the square law dynamic characteristic opposes the fall in anode current due to the direct grid voltage at potentiometer 26 and causes just sufficient energy to be delivered to condenser 34 to accommodate the desired signal by supplying energy at a rate equal to its consumption by the tube 22 as actuated by the signal oscillations. High amplitude static oscillations are not accommodated under this condition and by exhausting the charge on condenser 34 they appear to cyclically change the operating characteristic. If the grid voltage at potentiometer 26 or the impressed voltage at the source 36 are increased beyond the proper values for any given signal amplitude, the static oscillations begin to increase in the output circuit 38, 39 since both of these adjustments increase the rate of flow of energy into the condenser 34 to a value that is greater than the rate of flow out of the condenser 34 caused by the signal. In general the source of voltage 36 can be left fixed and a large range of signal values can be accommodated by varying only the direct grid voltage at the potentiometer 26; weak signals will require less and stronger signals more negative voltage at 26.

With a sensitive radio receiver connected to the circuits of Fig. 1, signal and static oscillations will be transferred from the circuit 19, 20 to the circuit 38, 39 by the small capacity of the grid to the anode in a screen grid tube and may cause undesirable effects. The variable condenser 44 is therefore adjusted to neutralize this effect; the windings 33 and 38 having been given the proper sense of direction for such purpose.

Two actions, repeatedly found, confirm the above described actions:

First: With the system properly adjusted, if the antenna is removed, each time it is put on there is a loud momentary signal and if static oscillations are present, they are not greatly reduced during a momentary period; and Second: With the system properly adjusted, as the circuits 4, 5 and 19, 20 are detuned slightly, strong static oscillations appear on either side of the tuned or resonant adjustment.

Both of these actions are due to the increase of the rate of flow of energy into condenser 34 when the signal carrier is absent, since the fall of anode current due to the direct grid voltage at 26 is not opposed by the rise of the average anode current due to the square law dynamic characteristic and the voltage impressed upon condenser 34 is high.

In Fig. 4, 54 represents an antenna, 55 a primary inductance which is grounded at 56. The secondary inductance 57 is coupled to the primary 55. One terminal of the inductance 57 connects to one terminal of the inductance 58; the remaining terminal of the inductance 58 connects to the ground 56. The remaining terminal of inductance 57 connects to the variable tuning capacity 59; the other terminal of the condenser 59 connects to the ground 56. The inductance 60 is coupled to the inductance 58 and is supplied with oscillating radio frequency energy from the generator 61.

The tuned circuit, comprising inductances 57, 58 and the condenser 59, is connected to the electron tube 62 by joining the control grid 63 to the common terminals of the inductance 57 and the condenser 59. The unipotential cathode 64, which is actuated by the heater 65 which may be energized by a battery or by alternating current, is connected to the slide on the potentiometer 66 which is by-passed to the ground 56 by the condenser 67. The potentiometer 66 is shunted across the battery 68; the negative terminal of battery 68 connects to the ground 56.

The anode 69 connects to one terminal of the primary inductance 70, the remaining terminal of the inductance 70 connects to the condenser 71 and to the resistor 72; the remaining terminal of the condenser 71 connects to the ground 56 and the remaining terminal of resistor 72 connects to the slide on the potentiometer 73 which is shunted across the battery 74; the negative terminal of the battery 74 connects to the ground 56.

The secondary inductance 75 is coupled to the primary 70 and the variable tuning capacity 76 is connected in shunt to the inductance 75. The circuit comprising inductance 75 and the condenser 76 is tuned to the intermediate frequency and connects to the intermediate frequency amplifier 77, which connects with the second detector 78, audio amplifier 79 and speaker 80.

In the operation of the circuit of Fig. 4, the circuit comprising 57, 58 and 59 is tuned to the desired signal frequency, the generator 61 is adjusted to produce a radio frequency which, by detector action, will produce the intermediate frequency to which the circuit 75, 76 is tuned. The source of energy 73 is set to a preselected value and the slide on potentiometer 66 is gradually moved off the ground toward the positive end until the signal appears. The range of signal that will be detected, with marked noise reduction, will vary with the value of the biasing voltage at potentiometer 66 and the voltage at the source of energy 73. Strong signals will require higher biasing voltage and more voltage at the source 73 and weak signals will require less voltage at potentiometers 66 and 73. The even order or square law dynamic characteristic is particularly favorable for detector action and the detector presents well defined limitation of transient oscillations without distortion of the resultant desired audio signal.

In general, the usual values of the parts useful in the first detector of a superheterodyne receiver will serve the purposes of the device of Fig. 4, except that the resistor 72, the condenser 71 and the electrode biases should be the same as those used in the device of Fig. 1. The neutralizing condenser of Fig. 1 is not essential in this case, as the frequencies to which the input and output circuits of tube 62 respond are so different that the transfer by the tube capacity may generally be ignored, but of course the tube 62 may be neutralized if desired.

In Fig. 5, 81 represents an antenna, 82 a primary inductance which is grounded at 83. The secondary inductance 84 is coupled to the primary 82. The variable tuning capacity 85 is connected in parallel to the inductance 84 through the large capacity of the by-pass condenser 86. The circuit comprising 84, 85, 86 is connected to the screen grid tube 87 as follows: one terminal of condenser 85 connects to the control grid 88, the remaining terminal of condenser 85 connects to the ground 83. The unipotential cathode 89, which is actuated by the heater 90, which may be energized by a battery or by alternating current, connects to the ground 83 through the biasing resistor 91 which is shunted by the by-pass condenser 92 and provided with a variable sliding contact 93. The screen grid 94 connects to the positive terminal of the battery 95 which is by-passed by condenser 96; the negative terminal of battery 95 connects to the ground 83. The anode 97 connects to one terminal of the primary inductance 98, the other terminal of inductance 98 being connected to the positive terminal of the battery 99 which is by-passed by the condenser 100; the negative terminal of battery 99 connects to the positive terminal of battery 95.

The secondary inductance 101 is coupled to the primary 98. One terminal of inductance 101 connects to one terminal of the inductance 102, the other terminal of inductance 102 connects to the slide 93 on resistor 91 which is by-passed to the ground 83 by the large condenser 103; the remaining terminal of inductance 101 connects to the variable tuning capacity 104; the other terminal of condenser 104 connects to the ground 83. The inductance 105 is coupled to the inductance 102 and is supplied with oscillating radio frequency current from the generator 106.

The tuned circuit comprising 101, 102, 103, 104 is connected to the electron tube 107 by joining the control grid 108 to the common terminals of inductance 101 and condenser 104. The unipotential cathode 109, which is actuated by the heater 110 which may be energized by a battery or by alternating current, is connected to the slide on the potentiometer 111, which is by-passed to ground 83 by the condenser 112. Potentiometer 111 is shunted across the battery 113; the negative terminal of battery 113 connects to the ground 83. The anode 114 connects to one terminal of the primary inductance 115; the variable tuning capacity 116 is connected in shunt to inductance 115, the remaining terminal of inductance 115 connects to the condenser 117 and to the resistor 118; the remaining terminal of condenser 117 connects to the ground 83 and the remaining terminal of resistor 118 connects to the slide on potentiometer 119 which is shunted across the battery 120; the negative terminal of battery 120 connects to the ground 83.

The secondary inductance 121 is coupled to the primary 115 and the variable tuning capacity 122 is connected in shunt to the inductance 121. The circuits 115, 116 and 121, 122 are adjusted to be tuned to the intermediate frequency and circuit 121, 122 connects to the intermediate frequency amplifier 123 which connects with the second detector 124, audio amplifier 125 and speaker 126. A voltage of constant polarity is obtained in the second detector by rectification of the signal oscillations; this voltage is transferred by the connecting wire 127, through the inductance 84 to the control grid 88 in the tube 87.

The operation of the tuned radio frequency amplifier, comprising circuits 84, 85, 86 and 101, 102, 103, 104 with the tube 87; the action of the local generator 106 and the production of the intermediate frequency by the action of the first detector, are well understood in the art. In this embodiment, my invention resides in the combination of these parts with the circuits of a first detector constructed to use the operating characteristics described in connection with Figs. 2, 3 and 4 and controlled in the range of signal it will fully accommodate by a voltage derived from the signal oscillations.

As described in connection with Fig. 4, the range of the detector increases and decreases with the value of the direct or biasing voltage on the grid. To make the signal oscillations supply a proper biasing voltage the cathode 109 is made positive to the ground by the voltage along the potentiometer 111 and when the slide 93 is moved from the ground toward the positive end of the cathode resistor 91, the grid 108 is made positive to the ground; this requires a further increase of the voltage along potentiometer 111 in order to obtain any given operating point. The two voltage sources 93 and 111 can be adjusted so that the first detector is adjusted to accommodate only a very small signal. The action for strong and weak signals is then as follows: The output of the first detector is amplified by the intermediate frequency amplifier 123 and is rectified by the second detector 124; a derived negative voltage, with respect to the ground, is developed which is transferred to the grid 88 of the radio frequency amplifier tube 87; the increase in the negative voltage on the grid 88 decreases the anode and screen currents in the tube 87 and thereby reduces the amplification; so the first detector circuit does not require as wide a range since the signals applied to it approach a constant level or amplitude. The voltage across resistor 91 is established by the anode and screen currents in the tube 87 and as these currents are reduced the grid 108 becomes less positive to the ground and more negative to the cathode 109. The range of the detector 107 is thus increased until it fully accommodates the signal and if the signal weakens or fades, the range of the detector decreases. The variation in range of the detector is partly dependent upon the value of the source of voltage at 119 since the energy output is greater at the higher voltage values. The described kind of automatic control is also operative if my invention is used in an amplifier instead of a detector.

The same values at 117, 118, 120 and at 111, 113 can be used as described in connection with Fig. 1.

In capitulation, while it is clear from the description of my invention that embodiments of it are not restricted to any particular values, I have found that the following values are suitable for the described embodiments.

In Figure 1:
Tube 22_____ Type 57
Source 26_____ One to two volts
Source 27_____ Six volts
Source 30_____ Three volts
Condenser 34_____ One-tenth microfarad
Resistor 35_____ Five megohms
Source 36_____ Twenty volts
Source 37_____ Forty volts In Figure 4:
Tube 62_____ Type 56
Source 66_____ One to two volts
Condenser 67_____ One-tenth microfarad
Source 68_____ Six volts
Condenser 71_____ One-tenth microfarad
Resistor 72_____ Three megohms
Source 73_____ Twenty volts
Source 74_____ Forty volts In Figure 5:
Tube 87_____ Type 58
Resistor 91_____ One thousand ohms
Condenser 92_____ One-tenth microfarad
Source 93_____ One-half to one volt
Source 95_____ One hundred volts
Source 99_____ One hundred and fifty volts
Tube 107_____ Type 56
Source 111_____ One to three volts
Condenser 112_____ One-tenth microfarad
Source 113_____ Six volts
Condenser 117_____ One-tenth microfarad
Resistor 118_____ Three megohms
Source 119_____ Thirty volts
Source 120_____ Fifty volts While I do not wish to be restricted to any theory of operation, none of the numerous tests which I have made is inconsistent with the theory outlined below.

In the operating condition, with the normal anode and grid voltages supplied, but with no signal present, the effective anode impedance to a high frequency signal is very high compared to the load impedance formed by the output primary and the large condenser, and the anode current has predominatingly an even order relation to a small alternating grid voltage as typified by the second power or square law characteristic. Under this condition, upon application of increasing alternating grid voltages, the unidirectional anode current tends to increase. This tendency of the average anode current to increase results in a change of the anode voltage to a less positive or toward the negative value, due to the presence of the resistor and the drop in voltage across it, and the tube will then operate as if a less positive direct potential were being applied across the terminals of the condenser. The tendency of the condenser to maintain a constant voltage prevents the aforesaid change of anode potential from occurring as rapidly as it otherwise would but due to the finite value of the condenser charge, the change appears in a brief time and the greater the value of the applied alternating grid voltage, the more rapidly the change takes place.

It is characteristic of the normal electron tube, used as described herein and considering only a fixed steady grid voltage, that, corresponding to the above mentioned region where a predominatingly even order relation exists between the grid voltage and the anode current, there is a region corresponding to lower anode voltages, where the even order relation becomes less marked and where the odd order relation tends to predominate, as is typified by rectilinear operation with third harmonic distortion. In the latter region, a change in the alternating grid voltage does not tend to make a substantial change in the average anode current and in fact, beyond a certain limit increases in alternating grid voltage cause substantially no change in the alternating anode current of the tube.

It appears to be also characteristic of electron tubes, when operated as described herein, that as the effective anode voltage becomes less positive, the amplification factor of the tube becomes less. According to this theory, therefore, assuming that an operating point has been chosen where, for the established anode supply voltage, a change of the direct grid voltage toward the positive would increase the anode current, if an alternating voltage is applied to the grid, the amplification will be reduced as the signal is increased and there is a limit of the possible output current available from the tube. The decrease in amplification and the approach to the limiting condition will occur rapidly when a relatively large signal is applied to the grid. Following this theory, a signal, which is small compared with that required to establish the last mentioned condition, will be amplified to a relatively great extent, while a signal, which is of a large order, will be amplified to a much smaller extent, and, to a certain extent, limited in the possible response which it may cause.

Due to the difficulties of measurement, I do not want to designate either the reduction of amplification or the output limiting effect as the one which is more effective in devices utilizing my invention, and it appears that both effects are useful, the predominating utility of one over the other depending on the voltages applied to the apparatus.

Applying this theory to the specific case of the reduction of the relative strength of static interference in the presence of signal, the application of the signal causes an increase of the average anode current, substantially up to the point which would be reached were the direct grid voltage made zero, resulting in operation of the tube at a slightly more negative or less positive anode voltage, at substantially the initial amplification. The static, however, cannot cause any substantial increase in the average anode current, the limit having been reached, so its tendency to increase the average anode current results in reducing the effective direct anode voltage more per applied alternating grid voltage than the signal does, and the resulting effective direct current anode operating condition is one where the amplification is relatively small and output limitation tends to occur. It is evident that the signal will be amplified to a much greater extent than the static, and that the static will tend to be limited.

A most important result of the change from even order operation to odd order operation as the applied alternating grid voltage is increased is that if, instead of a signal of the original applied frequency, there is chosen a derived signal depending only upon the even order components of the output signal, the amplitude discriminating properties of devices of my invention are enhanced. As a particular illustration, when a circuit according to my invention is used as a detector, as described in Fig. 4 and Fig. 5, the selected output is very effectively increased in amplitude with respect to the applied interfering static. This is true of the so-called first detector of a superheterodyne receiver as well as the second detector.

In order to avoid confusion with the known devices which have for their purpose the limitation of the amplitude of the output signal available from them, which will be referred to as amplitude limiters, the devices of the present invention will be referred to as energy limiters. The practical distinction is that, when received, radio signals in which static is present to such an extent that disturbing noise would be apparent at the output of the radio system, are applied to the input through my energy limiter, the resulting degree of reduction of the disturbing noise in the output is not approached by any of the many apparatuses which I have tested which involve an amplitude limiting device inserted anywhere, before, in or after, the usual radio system.

Amplitude limiters are characterized in that they change in operating characteristic from "full-response" to "no-response" upon a change in stimulus. Many wherein the required stimulus for complete change is a small percentage of the range of stimulus for which full-response occurs, are known in the art, but their applicability to the field of reduction of static in the presence of signal is so limited, that no large scale commercial use of them is known. The two reasons for this fact are; first, that although the peak values of any undesired signals in the input circuit which are so large as to cause noticeable disturbances in the output circuit, exceed the peak values of the desired signals in the input circuit by many times, the well known effect of the selective circuits traversed by the signals is to reduce the peak amplitudes of signals of the type of static, relative to the peak amplitudes of the accompanying signal in the same circuit, while extending the time during which the oscillation due to the disturbing signal has peaks of amplitude comparable with the peaks of the signal; and second, that no known amplitude limiter will sufficiently change its response characteristic over such a small range of stimulus that it will limit the amplitude of the static signals to nearly the peak amplitude of the desired signals when the amplitudes are so small that radical reduction would be commercially useful. Theoretically, these difficulties can be overcome, by amplifying the signals in the absence of selective circuits, but practical considerations have prevented the commercial adaption of such structures.

The theoretical distinction between the amplitude limiter and the energy limiter is not in the circuit, or in the interconnection of parts, as the apparatuses resemble each other in this respect, but principally in the relative values of the electrical parts, which provide an embodiment of the principle. The difference may be understood from the knowledge that the operating characteristic of the amplitude limiter must change radically at the end of the operating range, whereas, in the energy limiter, only sufficient output energy is available to respond to the stimulus of the desired signal, and for values of stimulus beyond the range of the desired signal, no energy remains to convey a signal to the response system.

The description in the specification is sufficient to enable one skilled in the art, to build and to operate a device according to the principle of my invention, but it is illustrative, and not definitive. My invention may be applied in any instance where it is desired to limit the response energy regardless of the extent of stimulus, by limiting the energy available for response purposes at that instant. The following arrangements are cited as devices using the principle of my invention:

(a) A device wherein the limited response energy is alternating or pulsating, rather than continuous as illustrated in the detail herein. The alternating energy may be synchronous with the stimulating forces, and in any operating phase relation therewith, being derived for example, from the incoming signal after limitation; or it may be asynchronous, in which case use may be made of response signals having a new frequency bearing a simple numerical relation to two applied frequencies. Such devices may be termed sources of response energy.

(b) Sources of response energy supply, limited in themselves such, for example, as photo-electric sources, may be used to supply the limited energy required. Various means other than those described may be used to limit the energy supplied to the response device. A typical example is a vacuum tube operating at saturation current. These arrangements may be referred to as energy limiting means.

(c) Various means may be used to store the limited quantity of response energy, of which an inductor associated with a magnetic field is a typical example. These arrangements are termed energy storage means.

(d) Various arrangements for adapting the range of operating capability of the device to the operating range of the desired signal may be used. The value of the signal may be modified to suit the device, or the range of the device may be changed to accommodate the applied signal, or both may be changed. These arrangements are termed control means.

(e) The control means for changing the operating range of the device may be operated in accordance with the incoming signal, either before or after it has been applied to the device, in a manner analogous with automatic volume control systems. The control means may be designed to maintain the operating range constant during the reception of a given message, or it may be manually varied from time to time or it may be designed to automatically vary in any desired manner as the gross or instantaneous value or character of the signal changes, and in each of these instances provision may be made to limit the range of operation of the control means, either to a fixed limit or to a varying limit. These arrangements are termed automatic or limited control means.

(f) Whenever it is desired to use an amplitude limiting device in conjunction with an energy limiting system or incorporated therein, any device, which performs the functions referred to in the foregoing discussion of such devices, may be used.

In every case where a device is used which differs substantially from the devices described herein in detail, it is understood that it will be a useful embodiment of my invention only to the extent that its capabilities are effective over the range of stimulus applied to it in operation.

What I claim is:

1. An electrical signal transfer system for discriminating in favor of low amplitude desired oscillations and against higher amplitude undesired oscillations, comprising a single vacuum tube having a cathode, a control grid, and an anode; an input circuit connected to said cathode and said grid; an output circuit connecting said cathode and said anode; said vacuum tube having a curved relation between the voltage between said grid and said cathode, and the current flowing between said cathode and said anode, said output circuit including an energy storage device and an output impedance in series relation therewith; and a source of limited response energy for said output circuit including an energy limiting element, said element being connected in a shunt path with respect to said energy storage device in said output circuit; the effective impedance of said source being substantially greater than the impedance between said anode and said cathode under the operating conditions and at least a thousand times as great as that of said device at the operating frequency.

2. An electrical signal transfer system for discriminating in favor of low amplitude desired oscillations and against higher amplitude undesired oscillations, comprising a vacuum tube detector having a cathode, a control grid, and an anode; an input circuit connected to said cathode and said grid; an output circuit connecting said cathode and said anode; said vacuum tube having a curved relation between the voltage between said grid and said cathode, and the current flowing between said cathode and said anode, said output circuit including an energy storage device and an output impedance in series relation therewith; and a source of limited response energy for said output circuit including an energy limiting element, said element being connected in a shunt path with respect to said energy storage device in said output circuit; the effective impedance of said source being substantially greater than the impedance between said anode and said cathode under the operating conditions and at least a thousand times as great as that of said device at the operating frequency.

3. An electrical signal transfer system for discriminating in favor of low amplitude desired oscillations and against higher amplitude undesired oscillations, comprising a single vacuum tube having a cathode, a control grid and an anode; an input circuit connected to said cathode and said grid; means maintaining a difference of effective unidirectional potential between the surface of said grid and said cathode; an output circuit connecting said cathode and said anode; said vacuum tube having a curved relation between the voltage between said grid and said cathode, and the current flowing between said cathode and said anode, said output circuit including an energy storage device and an output impedance in series relation therewith; and a source of limited response energy for said output circuit including an energy limiting element, said element being connected in a shunt path with respect to said energy storage device in said output circuit; the effective impedance of said source being substantially greater than the impedance between said anode and said cathode under the operating conditions and at least a thousand times as great as that of said device at the operating frequency.

4. An electrical signal transfer system comprising a transfer device having a first element, a control element, and an output element; an input circuit including said control element, a source of unidirectional energy for said control element, and an output circuit including said output element, one of said circuits including said first element; said transfer device having a curved relation between the stimulus in said input circuit and the response in said output circuit, said output circuit including an energy storage device and an output impedance in series relation therewith; and a source of limited response energy for said output circuit including an energy limiting element, said element being connected in a shunt path with respect to said energy storage device in said output circuit; the effective impedance of said source being substantially greater than the impedance between said anode and said cathode under the operating conditions and at least a thousand times as great as that of said device at the operating frequency.

5. In a radio receiver, a demodulator circuit containing an electron tube; an anode circuit for said tube, an output impedance and storage means for electrical energy, for supplying response energy, in series relation in said anode circuit; a source of energy; and means for supplying said storage means with electrical energy at a limited rate from said source.

6. In a superheterodyne radio receiver, a first detector circuit containing an electron tube; an anode circuit for said tube, an output impedance and storage means for electrical energy, for supplying response energy, in series relation in said anode circuit; a source of energy; and means for supplying said storage means with electrical energy at a limited rate from said source.

7. In a superheterodyne radio receiver, a first detector circuit containing an electron tube; a grid circuit for said tube, and an anode circuit for said tube; said grid circuit being supplied with a unidirectional voltage varied by the signal oscillations applied to said receiver, an output impedance and storage means for electrical energy, for supplying response energy, in series relation in said anode circuit; a source of energy; and means for supplying said storage means with electrical energy at a limited rate from said source.

8. An electrical signal transfer system for discriminating in favor of low amplitude desired oscillations and against higher amplitude undesired oscillations, comprising a single vacuum tube having a cathode, a control grid, and an anode; an input circuit connected to said cathode and said grid; an output circuit connecting said cathode and said anode; said vacuum tube having a curved relation between the voltage between said grid and said cathode, and the current flowing between said cathode and said anode; a primary source of electrical energy for said output circuit; a secondary storage source for supplying electrical energy to said output circuit; means, having an impedance substantially greater than the impedance between said anode and said cathode under the operating conditions, for supplying said secondary source with electrical energy from said primary source at a limited rate, and means for supplying energy from said secondary source to said output circuit whereby the energy in said output circuit is available to produce a substantial response for the desired low amplitude oscillations and a limited response for the undesired high amplitude oscillations.

9. An electrical signal transfer system for discriminating in favor of low amplitude desired oscillations and against higher amplitude undesired oscillations, comprising a vacuum tube detector having a cathode, a control grid and an anode; an input circuit connected to said cathode and said grid; an output circuit connecting said cathode and said anode; said vacuum tube detector having a curved relation between the voltage between said grid and said cathode, and the current flowing between said cathode and said anode; a primary source of electrical energy for said output circuit; a secondary storage source for supplying electrical energy to said output circuit; means, having an impedance substantially greater than the impedance between said anode and said cathode under the operating conditions, for supplying said secondary source with electrical energy from said primary source at a limited rate, and means for supplying energy from said secondary source to said output circuit, whereby the energy in said output circuit is available to produce a substantial response for the desired low amplitude oscillations and a limited response for the undesired high amplitude oscillations.

10. An electrical signal transfer system for discriminating in favor of low amplitude desired oscillations and against higher amplitude undesired oscillations, comprising a single vacuum tube having a cathode, a control grid and an anode; an input circuit connected to said cathode and said grid; means maintaining a difference of effective unidirectional potential between the surface of said grid and said cathode; an output circuit connecting said cathode and said anode; said vacuum tube having a curved relation between the voltage between said grid and said cathode and the current flowing between said cathode and said anode; a primary source of electrical energy for said output circuit; a secondary storage source for supplying electrical energy to said output circuit; means, having an impedance substantially greater than the impedance between said anode and said cathode under the operating conditions, for supplying said secondary source with electrical energy from said primary source at a limited rate, and means for supplying energy from said secondary source to said output circuit, whereby the energy in said output circuit is available to produce a substantial response for the desired low amplitude oscillations and a limited response for the undesired high amplitude oscillations.

DAVID G. McCAA.